United States Patent Office 3,317,611
Patented May 2, 1967

3,317,611
PREPARATION OF CYCLOALKYL AROMATIC COMPOUNDS
James J. Louvar, Evanston, and Alfonso G. Francoy-Atares, Mount Prospect, Ill., assignors to Universal Oil Products Company, Des Plaines, Ill., a corporation of Delaware
No Drawing. Filed Sept. 16, 1965, Ser. No. 487,920
10 Claims. (Cl. 260—612)

This invention relates to a process for the preparation of cycloalkyl aromatic compounds. More particularly, the invention is directed to a process for alkylating an aromatic compound with a similar or dissimilar aromatic compound in the presence of certain catalytic compositions of matter to produce the desired compounds.

It has now been discovered that improved yields of cycloalkyl aromatic compounds may be obtained by treating an aromatic compound in the presence of hydrogen in the presence of certain catalytic compositions of matter which are hereinafter set forth in greater detail, said process being effected at alkylation conditions. The cycloalkyl aromatic compounds thus produced will find a wide variety of uses in the chemical field, especially as intermediates in the preparation of other organic compounds, in pharmaceuticals, resins, etc. For example, a phenylcyclohexane which is obtained by treating benzene with hydrogen in the presence of certain catalytic compositions of matter is an important chemical intermediate. By subjecting this compound to oxidation it is possible to obtain phenol and cyclohexanone, both of which are important intermediates for the preparation of plastics, resins and synthetic fibers. It is to be noted that when treating the aromatic compound with hydrogen in the presence of the hereinafter set forth catalyst according to the process of this invention that the desired product will be a non-condensed cycloalkyl aromatic compound.

It is therefore an object of this invention to provide a process for obtaining improved yields of non-condensed cycloalkyl aromatic compounds.

A further object of this invention is to provide a process for treating aromatic hydrocarbons with hydrogen in the presence of a catalytic composition of matter to obtain greater yields of the desired non-condensed cycloalkyl aromatic compound.

In a broad aspect, one embodiment of this invention resides in a process which comprises alkylating an aromatic compound with a compound selected from the group consisting of similar and dissimilar aromatic compounds in the presence of hydrogen and an alkylation catalyst comprising a metal of Group VIII of the Periodic Table composited on a silica-alumina base at allykation conditions, and recovering the resultant cycloalkyl aromatic compound.

A further embodiment of this invention is found in a process which comprises alkylating an aromatic compound with a compound selected from the group consisting of similar and dissimilar aromatic compounds in the presence of hydrogen and an alkylation catalyst comprising nickel composited on a base consisting of 75% silica and 25% alumina at a temperature in the range of from about 25° to about 300° C. and at a pressure in the range of from about 2 to about 500 pounds per square inch, and recovering the resultant cycloalkyl aromatic compound.

A specific embodiment of this invention is found in a process for the preparation of a cycloalkyl aromatic compound which comprises treating anisole and toluene with hydrogen in the presence of a catalyst comprising nickel composited on a base consisting of 75% silica and 25% alumina at a temperature in the range of from about 50° to about 150° C. and at a pressure in the range of from about 50 to about 100 pounds per square inch, and recovering the resultant o-, m-, and p-(1-methylcyclohexyl)anisole.

Other objects and embodiments will be found in the following further detailed description of this invention.

As hereinbefore set forth, the present invention is concerned with a process for obtaining improved yields of cycloalkyl aromatic compounds. The terms "aromatic compounds" and "cycloalkyl aromatic compounds" as used in the present specification and appended claims will refer to both unsubstituted and substituted compounds. Examples of aromatic compounds which may be utilized as the starting materials in the process of this invention possess the generic formula:

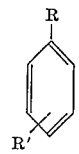

in which R is selected from the group consisting of hydrogen, alkyl, hydroxyl and alkoxyl radicals and R' is selected from the group consisting of hydrogen and alkyl radicals. Examples of these aromatic compounds which may be used include benzene, toluene, ethylbenzene, n-propylbenezene, isopropylbenzene (cumene), anisole (methylphenyl ether), ethylphenyl ether, n-propylphenyl ether, isopropylphenyl ether, phenol, etc., o-xylene, m-xylene, p-xylene, methyl-o-tolyl ether, methyl-m-tolyl ether, methyl-p-tolyl ether, o-cresol, m-cresol, p-cresol, etc., o-methylphenol, m-methylphenol, p-methylphenol, etc. It is also contemplated within the scope of this invention that the charge stock may comprise a mixture of aromatic compounds so that the alkylation of the aromatic compound may thus be effected using dissimilar aromatic compounds. Examples of these mixtures include a benzene-toluene mixture, a toluene-anisole mixture, an ethylbenzene-toluene mixture, a phenol-toluene mixture, etc.

The alkylation reaction is effected at temperatures ranging from about ambient temperature (about 25° C.) up to about 300° C. or more and pressures ranging from about 2 to about 1500 pounds per square inch or more. The pressure utilized will depend upon the reactants undergoing hydroalkylation and upon the particular temperatures being used, the amount of pressure being that which is sufficient to maintain a major portion of the reactants in a liquid phase. While it is contemplated that a portion of the pressure will be provided by the hydrogen for the hydrogenation portion of the reaction, the remainder may, if necessary, be supplied by an inert gas such as nitrogen.

The process of this invention is effected in the presence of a catalyst comprising a metal of Group VIII of the Periodic Table composited on a silica-alumina support, the composition of the support being of a particular ratio of silica to alumina. The silica is present in the final support composite in mole ratio of approximately 5 moles of silica per mole of alumina, or in other words a composition of approximately 75% silica and 25% alumina. When this combination of alumina ($Al_2O_3$) combines with 5 molecules of silica ($SiO_2$) to produce a catalyst base which, when combined with a Group VIII metal, will produce an optimum amount of hydroalkylation activity. The silica which is utilized may be prepared in any suitable manner, one method being to commingle water glass and a mineral acid such as hydrochloric acid, sulfuric acid, etc., under conditions to precipitate a silica hydrogel. The silica hydrogel may then if so desired, be allowed to age, after the pH has been adjusted to a range of from about 3 to about 8, for a period of about 1 hour or more, thus allowing the silica to at least partially polymerize. While the silica is allowed to age for at least 1 hour, the preferred time period during which the silica ages at a pH in the range of from about 3 to about 8 will be from about 0.5 to about 5 hours and preferably 1 hour to about 3 hours. In addition, the preferred pH at which the silica hydrogel is allowed to age will be in the lower range between 3 and about 8 and will usually be in the range of from about 3 to about 5. Following this aging of the silica gel, the pH is then raised by the addition of a basic substance such as ammonium hydroxide, sodium hydroxide, etc. to the upper range of the aforementioned limit, generally in a range of from about 6.5 to about 8. Following this, the alumina in the form of an aluminum salt such as aluminum sulfate, aluminum chloride, aluminum nitrate, etc., is added thereto in an amount so that the finished composite will contain 75% silica and 25% alumina. The silica-alumina hydrogel is precipitated and treated by washing, filtering, reslurrying, spray drying, pelleting and calcination in the usual manner.

The active metallic component of the catalyst is then composited with the base, generally in an amount of from about 0.01% to about 20% by weight of the catalyst and preferably in an amount of from about 0.1 to about 10% by weight of the catalyst. The particularly desirable metal components to be incorporated into the catalyst comprise platinum, palladium, nickel, cobalt, ruthenium, rhodium, osmium, iridium and iron and may be incorporated into the catalyst in any suitable manner. One such manner is to composite the metal component with the base by forming an aqueous solution of the halide of the metal such as platinum chloride, platinum bromide, palladium chloride, palladium bromide, or a nitrate such as nickel nitrate, etc., further diluting the solution and adding the resultant dilute solution to the base in a steam drier. Other soluble metal compositions may be employed, such as colloidal solutions or suspensions including the desired metal cyanides, metal hydroxides, metal oxides, metal sulfides, etc. In cases where these compositions are not soluble in water, at the temperature used, other suitable solvents such as alcohols, ethers, etc., may be utilized.

The resulting composite will, after all of the components of the catalyst are present therein, be dried for a period ranging from about 1 to about 8 hours or more in a steam drier and thereafter oxidized in an oxidizing atmosphere such as air or other oxygen-containing gas at a temperature in the range of from about 1100° to about 1700° F. and preferably in a range of from about 1300° to about 1400° F. for a period of time ranging from 1 to about 8 hours or more. Following this oxidation at a relatively high temperature, the catalyst is then reduced for a period ranging from about ½ hour to about 1 hour at a temperature in the range of from about 600° to about 1000° F. and preferably at a temperature of 800° F. in the presence of hydrogen. It is also contemplated that the catalyst may be reduced in situ, that is by placing the catalyst in the reactor and submitting said catalyst to a hydrogen purge of the system at a temperature of about 600° F., thereby reducing the catalyst prior to use thereof. Specific examples of catalysts which may be used comprise 5% by weight of nickel composited on a silica-alumina base which contains 75% silica and 25% alumina, 0.375% palladium composited on a base of a similar nature, 0.375% platinum composited on a base of a similar nature, etc.

The process of this invention may be referred to as a hydroalkylation process and usually will be most effective when utilizing temperature and pressure conditions which are favorable. The products of the process which are referred to as cycloalkyl aromatic compounds result from the alkylation of an aromatic compound by an intermediate carbonium ion formed by the protonation of the intermediate olefins which are formed in the hydrogenation step. When using dissimilar aromatic compounds as starting materials in the presence of this invention such as a benzene-toluene mixture, a toluene-anisole mixture, etc., it is possible to obtain specific compounds as the desired product. For example, improved results may be obtained by utilizing reaction conditions whereby one of the dissimilar aromatic compounds will hydrogenate faster than the other aromatic compound. When these conditions are used, the aromatic compound which hydrogenates faster will alkylate the less active compound. For example, when utilizing a mixture of benzene and toluene, the desired product will contain a major portion of cyclohexyltoluene inasmuch as benzene will hydrogenate at a faster rate than will toluene. In addition, it is also possible to hydrogenate a mixture in which one of the aromatic compounds hydrogenates at a lower rate but has a high alkylation potential. Thus, when using benzene and anisole as the starting materials, the product will contain a major portion of cyclohexylanisole.

The process of this invention utilizing a specific hydroalkylation catalyst of the type hereinbefore set forth in greater detail may be effected in any suitable manner and may comprise either a batch or continuous type operation. When utilizing a batch type operation, the hydroalkylation catalyst comprising a Group VIII metal composited on a silica-alumina catalyst base containing 75% silica and 25% alumina is placed in an appropriate apparatus. The aromatic compound or mixture of aromatic compounds is added to the apparatus which is thereafter sealed. A particularly suitable type of apparatus for this operation comprises a rotating autoclave. Hydrogen is pressured in, following which the apparatus is heated until a noticeable change in pressure occurs, after which the apparatus is maintained at the reaction temperature for a predetermined period of time. At the end of this residence time, the apparatus is allowed to cool to room temperature, the excess is vented and the reaction product recovered and filtered to remove the catalyst. The reaction product is then subjected to conventional separation means such as fractional distillation under reduced pressure, crystallization, etc., whereby the desired cycloalkyl aromatic compound is separated and recovered from unreacted starting materials.

It is also contemplated within the scope of this invention that the process may be effected in a continuous manner of operation. When such an operation is used, the starting materials comprising an aromatic compound or a mixture of aromatic compounds is continuously charged to a reaction zone containing the hydroalkylation catalyst and which is maintained at the proper operating conditions of temperature and pressure. Hydrogen is pressured in and after a predetermined residence time, the reactor effluent is continuously withdrawn and purified whereby the desired product comprising the non-condensed cycloalkyl aromatic compound is separated from unreacted starting materials, the latter then being recycled to form a portion of the feed stock. When utilizing a hydroalkylation catalyst of the type of the present invention, a particularly effective type of operation comprises a fixed bed operation in which the starting material is passed in either an upward or downward flow over the fixed bed of the catalyst. Other types of operation which may be utilized include the compact moving bed type of operation in which the catalyst and the reactants pass either concurrently or countercurrently to each other or the slurry type of operation in which the catalyst is carried into the reaction zone as a slurry in the reactants.

Examples of non-condensed cycloalkyl aromatic compounds which may be prepared according to the process of this invention include o-, m-, and p-cyclohexyltoluene, o-, m-, and p-(1-methylcyclohexyl)toluene, o-, m-, and p-(1-methylcyclohexyl)ethylbenzene, o-, m-, and p-(1- methylcyclohexyl)n-propylbenzene, o-, m-, and p-(1-methylcyclohexyl)cumene, o-, m-, and p-(1-methylcyclohexyl)-phenol, o-, m-, and p-(1-methylcyclohexyl)anisole, o-, m-, and p-(1-ethylcyclohexyl)ethylbenzene, o-, m-, and p-(1-hydroxycyclohexyl)phenol, etc. It is to be understood that the aforementiond compounds are only representative of the type of compounds which may be prepared, and that the present invention is not necessarily limited thereto.

The following examples are given to illustrate the process of the present invention which, however, are not intended to limit the generally broad scope of the present invention in strict accordance therewith.

Example I

A base containing 75% silica and 25% alumina was prepared by diluting 400 cc. of hydrochloric acid with 800 cc. of water, following which 1610 g. of water glass (28% SiO$_2$) and 3229 cc. of water was added to the hydrochloric acid solution with continuous stirring over a 0.5 hour period. The pH of the solution was adjusted to 3.7 by the addition of 31 cc. of water glass. Following this, the sol was then stirred until it became viscous, 3800 cc. of water then being added. The sol was allowed to age at this pH while stirring at the temperature for about 1 hour. Following this, 6 liters of water and 15 cc. of ammonium hydroxide was added to raise the pH to 7.1 while continuously stirring the mixture, the stirring then being continued for an additional hour. The alumina portion of the catalyst was added by the addition of 2020 g. of aluminum sulfate solution. The pH was then adjusted to 7.9 by adding 640 cc. of ammonium hydroxide plus 640 cc. of water to the silica-alumina sol, said addition being accompanied by vigorous stirring. The resultant gel was slurried for 15 minutes, filtered, re-slurried in 8 liters of water, spray-dried, washed free of salts, pilled and calcined at 1200° F.

The finished catalyst was prepared by adding nickel nitrate to the base in an amount sufficient so that the finished catalyst contained 5% by weight of nickel, following which the catalyst was reduced at a temperature of 1000° F. in the presence of hydrogen.

To a reaction apparatus comprising a 500 cc. hydrogenation bottle was charged 85.5 g. (0.93 mole) of toluene and 5.0 g. of the catalyst prepared according to the above paragraphs. The bottle was mounted onto the apparatus, pressured with 60 pounds per square inch of hydrogen, heated to 100° C. and shaken for a period of 6 hours. Following this, the reaction mixture was allowed to cool to room temperature and vented to remove the catalyst and subjected to analysis by means of a gas-liquid chromatograph. It was determined that the product contained a mixture of ortho-(1-methylcyclohexyl)toluene, meta-(1-methylcyclohexyl)toluene and para-(1-methylcyclohexyl)toluene, the products amounting to an 84% conversion of toluene to the methylcyclohexyltoluenes.

Example II

A catalyst base is prepared in a manner similar to that set forth in Example I above. To the base is added a sufficient amount of palladium chloride so that the finished catalyst will contain about 0.375% by weight of palladium composited on the base catalyst of 75% silica and 25% alumina.

A mixture of 92 g. (1.0 mole) of toluene and 108 g. (1.0 mole) of anisole is placed in a hydrogenation apparatus along with 5 g. of a catalyst which is prepared according to the above paragraph. The bottle is sealed and pressured with 75 pounds per square inch of hydrogen. Following this, the apparatus is heated to a temperature of about 100° C. and shaken for a period of 6 hours. At the end of the desired residence time, the apparatus and contents thereof are allowed to cool to room temperature. The reaction product is vented to remove the catalyst and analyzed by means of a gas-liquid chromatograph. It will be determined that the product will contain o-(1-methylcyclohexyl)anisole, m-(1-methylcyclohexyl)anisole and p-(1-methylcyclohexyl)anisole.

Example III

A mixture comprising 92 g. (1.0 mole) of toluene and 120 g. (1.0 mole) of cumene is placed in a hydrogenation apparatus along with 5 g. of a catalyst comprising 5% by weight of nickel composited on a base consisting of 75% silica and 25% alumina. The apparatus is sealed and hydrogen pressed in until a pressure of about 60 pounds per square inch is reached. The apparatus is then heated to a temperature of about 100° C. and maintained thereat for a period of about 6 hours while vigorously shaking the mixture. At the end of this time, the apparatus and contents thereof are allowed to cool to room temperature and the reaction product recovered after filtration to remove the catalyst. It will be determined that the product upon analysis by a gas-liquid chromatograph will contain a mixture of o-, m-, and p-(1-methylcyclohexyl)cumene.

Example IV

In this example, a mixture of 92 g. (1.0 mole) of toluene and 106 g. (1.0 mole) of ethylbenzene are treated in a manner similar to that set forth in the above examples in the presence of a catalyst prepared according to the method set forth in Example I. Upon completion of the desired residence time of about 6 hours, said reaction being effected at reaction temperatures comprising a pressure of about 60 pounds per square inch of hydrogen and a temperature of 100° C., the reaction product is filtered to remove the catalyst and subjected to an analysis by means of a gas-liquid chromatograph. The crude product will be found to contain a mixture of o-, m-, and p-(1-methylcyclohexyl)ethylbenzene.

Example V

In this example, a mixture of 92 g. (1.0 mole) of toluene and 90 g. (1.0 mole) of phenol is placed in a hydrogenation apparatus along with 5 g. of a catalyst comprising .375% by weight of palladium composited on a base consisting of 75% silica and 25% alumina. The apparatus is sealed and hydrogen pressed in until a pressure of 75 pounds per square inch is reached. The apparatus is then heated to a temperature of about 100° C. and maintained thereat for a period of about 6 hours, during which time the reaction mixture is vigorously shaken. At the end of the residence time, the apparatus and contents thereof are cooled to room temperature and the reaction product separated from the catalyst by means of filtration after having first vented the excess pressure. A gas-liquid chromatographic analysis of the product will disclose the presence of a mixture of o-, m-, and p-(1-methylcyclohexyl)phenol.

We claim as our invention:

1. A process which comprises alkylating an aromatic compound with a compound selected from the group consisting of similar and dissimilar aromatic compounds in the presence of hydrogen and an alkylation catalyst consisting essentially of a metal of Group VIII of the Periodic Table composited on a base consisting of about 75% silica and about 25% alumina at the alkylation conditions, and recovering the resultant cycloalkyl aromatic compound.

2. A process which comprises alkylating an aromatic compound with a compound selected from the group consisting of similar and dissimilar aromatic compounds in the presence of hydrogen and an alkylation catalyst consisting essentially of a metal of Group VIII of the Periodic Table composited on a base consisting of about 75% silica and about 25% alumina at a temperature in the range of from about 25° to about 300° C. and at a pressure in the range of from about 2 to about 500 pounds per square inch, and recovering the resultant cycloalkyl aromatic compound.

3. A process which comprises alkylating an aromatic compound with a compound selected from the group consisting of similar and dissimilar aromatic compounds in the presence of hydrogen and an alkylation catalyst consisting essentially of nickel composited on a base consisting of 75% silica and 25% alumina at a temperature in the range of from about 25° to about 300° C. and at a pressure in the range of from about 2 to about 500 pounds per square inch, and recovering the resultant cycloalkyl aromatic compound.

4. A process which comprises alkylating an aromatic compound with a compound selected from the group consisting of similar and dissimilar aromatic compounds in the presence of hydrogen and an alkylation catalyst consisting essentially of palladium composited on a base consisting of 75% silica and 25% alumina at a temperature in the range of from about 25° to about 300° C. and at a pressure in the range of from about 2 to about 500 pounds per square inch, and recovering the resultant cycloalkyl aromatic compound.

5. A process which comprises alkylating an aromatic compound with a compound selected from the group consisting of similar and dissimilar aromatic compounds in the presence of hydrogen and an alkylation catalyst consisting essentially of platinum composited on a base consisting of 75% silica and 25% alumina at a temperature in the range of from about 25° to about 300° C. and at a pressure in the range of from about 2 to about 500 pounds per square inch, and recovering the resultant cycloalkyl aromatic compound.

6. A process for the preparation of a cycloalkyl aromatic compound which comprises treating toluene in the presence of a catalyst consisting essentially of nickel composited on a base consisting of 75% silica and 25% alumina at a temperature in the range of from about 50° to about 150° C. and at a pressure in the range of from about 50 to about 100 pounds per square inch, and recovering the resultant o-, m-, and p-(1-methylcyclohexyl)toluene.

7. A process for the preparation of a cycloalkyl aromatic compound which comprises treating anisole and toluene with hydrogen in the presence of a catalyst consisting essentially of palladium composited on a base consisting of 75% silica and 25% alumina at a temperature in the range of from about 50° to about 150° C. and at a pressure in the range of from about 50 to about 100 pounds per square inch, and recovering the resultant o-, m-, and p-(1-methylcyclohexyl)anisole.

8. A process for the preparation of a cycloalkyl aromatic compound which comprises treating cumene and toluene with hydrogen in the presence of a catalyst consisting essentially of nickel composited on a base consisting of 75% silica and 25% alumina at a temperature in the range of from about 50° to about 150° C., and at a pressure in the range of from about 50 to about 100 pounds per square inch, and recovering the resultant o-, m-, and p-(1-methylcyclohexyl)cumene.

9. A process for the preparation of a cycloalkyl aromatic compound which comprises treating ethylbenzene and toluene with hydrogen in the presence of a catalyst consisting essentially of nickel composited on a base consisting of 75% silica and 25% alumina at a temperature in the range of from about 50° to about 150° C. and at a pressure in the range of from about 50 to about 100 pounds per square inch, and recovering the resultant o-, m-, and p-(1-methylcyclohexyl)ethylbenzene.

10. A process for the preparation of a cycloalkyl aromatic compound which comprises treating phenol and toluene with hydrogen in the presence of a catalyst consisting essentially of palladium composited on a base consisting of 75% silica and 25% alumina at a temperature in the range of from about 50° to about 150° C. and at a pressure in the range of from about 50 to about 100 pounds per square inch, and recovering the resultant o-, m-, and p-(1-methylcyclohexyl)phenol.

References Cited by the Examiner
UNITED STATES PATENTS

| | | | |
|---|---|---|---|
| 2,721,226 | 10/1955 | Ciapetta et al. | 260—667 |
| 2,784,241 | 3/1957 | Holm | 260—668 |
| 3,153,678 | 10/1964 | Logemann | 260—667 |
| 3,159,687 | 12/1964 | Lehman | 260—668 |

DELBERT E. GANTZ, *Primary Examiner.*

C. R. DAVIS, *Assistant Examiner.*